(12) United States Patent
Nishino et al.

(10) Patent No.: US 11,591,045 B2
(45) Date of Patent: Feb. 28, 2023

(54) OPERATING DEVICE FOR HUMAN POWERED VEHICLE

(71) Applicant: SHIMANO INC., Sakai (JP)

(72) Inventors: Takafumi Nishino, Sakai (JP); Shingo Sakurai, Sakai (JP)

(73) Assignee: SHIMANO INC., Sakai (JP)

( * ) Notice: Subject to any disclaimer, the term of this patent is extended or adjusted under 35 U.S.C. 154(b) by 709 days.

(21) Appl. No.: 15/941,002

(22) Filed: Mar. 30, 2018

(65) Prior Publication Data

US 2019/0300118 A1 Oct. 3, 2019

(51) Int. Cl.
| | |
|---|---|
| *B62M 25/08* | (2006.01) |
| *B62K 23/06* | (2006.01) |
| *B62L 3/02* | (2006.01) |

(52) U.S. Cl.
CPC ............ *B62M 25/08* (2013.01); *B62K 23/06* (2013.01); *B62L 3/023* (2013.01)

(58) Field of Classification Search
CPC ......... B25M 25/08; B62K 23/06; B62L 3/023
See application file for complete search history.

(56) References Cited

U.S. PATENT DOCUMENTS

| | | | |
|---|---|---|---|
| 10,894,578 B2 | 1/2021 | Cahan et al. | |
| 2007/0000343 A1* | 1/2007 | Ueno | B62K 23/06 74/473.12 |
| 2008/0168856 A1* | 7/2008 | Tetsuka | B62M 25/04 74/502.2 |
| 2009/0120751 A1* | 5/2009 | Lin | B60T 7/10 188/344 |
| 2013/0031998 A1* | 2/2013 | Miki | B62L 3/023 74/473.12 |
| 2013/0180815 A1* | 7/2013 | Dunlap | B60T 11/236 188/344 |
| 2014/0352478 A1* | 12/2014 | Gao | B62M 25/08 74/488 |
| 2016/0152302 A1* | 6/2016 | Nishino | B62M 25/08 701/2 |

(Continued)

FOREIGN PATENT DOCUMENTS

| | | | | |
|---|---|---|---|---|
| DE | 102017002769 A1 | * | 10/2017 | .............. B62L 3/023 |
| EP | 1498347 A2 | * | 1/2005 | .............. B62L 3/023 |
| GB | 2163226 A | * | 2/1986 | .............. B60T 11/22 |

OTHER PUBLICATIONS

EPO Translation of DE 102017002769 A1, Komatsu et al., Oct. 26, 2017 (Year: 2022).*

*Primary Examiner* — Daniel D Yabut
(74) *Attorney, Agent, or Firm* — Mori & Ward, LLP

(57) ABSTRACT

An operating device for a human powered vehicle comprises a base member and an operating member configured to be movably coupled to the base member. A controller is configured to generate an operation signal in response to an operation of an electrical switch. An electric generator is configured to generate electric power in response to the operation of the electrical switch. A power storage is configured to store the electric power generated by the electric generator. The electrical switch and the electric generator is provided on a first location. The power storage is provided on a second location different from the first location. The second location is defined on at least one of the operating member and a surface of the base member.

16 Claims, 14 Drawing Sheets

(56) References Cited

U.S. PATENT DOCUMENTS

| | | | |
|---|---|---|---|
| 2016/0185421 A1* | 6/2016 | Komatsu | B62M 9/12 |
| | | | 701/2 |
| 2016/0311499 A1* | 10/2016 | Kasai | B62M 25/08 |
| 2017/0002841 A1* | 1/2017 | Neutsch | F16D 25/12 |
| 2017/0305488 A1* | 10/2017 | Komatsu | B62K 23/06 |
| 2017/0305491 A1* | 10/2017 | Komatsu | B62K 23/06 |
| 2018/0057103 A1* | 3/2018 | Komatsu | F15B 7/08 |
| 2018/0057105 A1 | 3/2018 | Komatsu et al. | |

\* cited by examiner

OPERATING DEVICE FOR HUMAN POWERED VEHICLE

BACKGROUND OF THE INVENTION

Field of the Invention

The present invention relates to an operating device for a human powered vehicle.

Discussion of the Background

Operating devices for human powered vehicles such as bicycles include shift operating devices attached to bicycle handles to be operated to transmit signals to bicycle components such as brakes, derailleurs, suspension, and/or adjustable seatposts.

SUMMARY OF THE INVENTION

In accordance with a first aspect of the present invention, an operating device for a human powered vehicle comprises a base member, an operating member, an electrical switch, a controller, an electric generator, and a power storage. The base member is configured to be attached to the human powered vehicle. The operating member is configured to be movably coupled to the base member. The controller is configured to generate an operation signal in response to an operation of the electrical switch. The electric generator is configured to generate electric power in response to the operation of the electrical switch. The power storage is configured to store the electric power generated by the electric generator. The electrical switch and the electric generator is provided on a first location. The power storage is provided on a second location different from the first position. The second location is defined on at least one of the operating member and a surface of the base member.

With the operating device according to the first aspect, since the power storage can be disposed in a different space from a space in which the electrical switch and the electric generator, it is possible to flexibly design a size of the power storage.

In accordance with a second aspect of the present invention, the power storage is provided on the second location such that at least part of the power storage is not covered by the at least one of the base member and the operating member.

With the operating device according to the second aspect, it is possible to flexibly design a size of the power storage.

In accordance with a third aspect of the present invention, the operating device according to the first or second aspect further comprises a communicator configured to wirelessly transmit the operation signal generated by the controller.

With the operating device according to the third aspect, it is possible to omit wiring from the controller to a component to be controlled by the controller.

In accordance with a fourth aspect of the present invention, the operating device according to any one of the first to third aspects further comprises a housing accommodating at least the electrical switch and the electric generator. The power storage is provided outside the housing.

With the operating device according to the fourth aspect, it is further possible to flexibly design a size of the power storage.

In accordance with a fifth aspect of the present invention, the operating device according to any one of the first to fourth aspects further comprises an electric wiring electrically connecting the power storage to the electric generator.

With the operating device according to the fifth aspect, it is possible to supply the electric power generated by the electric generator with minimum loss of the electric power.

In accordance with a sixth aspect of the present invention, the operating device according to any one of the first to fifth aspects further comprises a rectifier electrically arranged between the electric generator and the power storage.

With the operating device according to the sixth aspect, it is possible to effectively store the electric power generated by the electric generator.

In accordance with a seventh aspect of the present invention, the operating device according to any one of the first to sixth aspects is configured so that the second location is defined on the operating member. The operating member has an operational part to which a user applies force upon an operation of the operating member and a non-operational part opposite to the operational part. At least a part of the power storage is provided in the non-operational part of the operating member.

With the operating device according to the seventh aspect, it is possible to provide the power storage in the operating member.

In accordance with an eighth aspect of the present invention, the operating device according to the seventh aspect is configured so that the non-operational part is opposite to the operational part in a moving direction of the human powered vehicle.

With the operating device according to the eighth aspect, since the power storage can be disposed in the non-operational part which the user does not forcefully contact, it is possible to utilize a dead space.

In accordance with a ninth aspect of the present invention, the operating device according to the seventh or eighth aspect is configured so that the operating member has a recess in the non-operational part. At least a part of the power storage is provided in the recess.

With the operating device according to the ninth aspect, since the power storage is provided in the recess, the power storage is unlikely to interfere the operation of the operating member.

In accordance with a tenth aspect of the present invention, the operating device according to the ninth aspect is configured so that the power storage has an attachment surface extending along an inner surface of the recess.

With the operating device according to the tenth aspect, the power storage is further unlikely to interfere the operation of the operating member.

In accordance with an eleventh aspect of the present invention, the operating device according to the ninth or tenth aspect is configured so that the operational part includes an operational surface to which a user applies force upon operation of the operating member. The recess has a bottom surface opposite to the operational surface in the moving direction of the human powered vehicle. The attachment surface extends along the bottom surface.

With the operating device according to the eleventh aspect, the power storage is further unlikely to interfere the operation of the operating member. Further, it is possible to attach a battery to the attachment surface.

In accordance with a twelfth aspect of the present invention, the operating device according to any one of the first to sixth aspects is configured so that the second location is defined on the surface of the base member. The surface of the base member includes an outer surface. At least a part of the power storage is provided between the outer surface of the base member and a cover covering at least a part of the base member.

With the operating device according to the twelfth aspect, it is possible to protect the power storage by the cover.

In accordance with a thirteenth aspect of the present invention, the operating device according to the twelfth aspect is configured so that the outer surface of the base member has a non-holding surface on which the power storage is provided.

With the operating device according to the thirteenth aspect, since the power storage is provided on the non-holding surface, it is possible to utilize a dead space.

In accordance with a fourteenth aspect of the present invention, the operating device according to the thirteenth aspect is configured so that the outer surface of the base member has a load applied surface to which a user applies a load. A first distance between the operating member and the non-holding surface is shorter than a second distance between the operating member and the load applied surface.

With the operating device according to the fourteenth aspect, since the power storage is provided on the non-holding surface to which a load is unlikely to be applied, it is possible to further utilize a dead space.

In accordance with a fifteenth aspect of the present invention, the operating device according to the thirteenth or fourteenth aspect is configured so that the power storage has an attachment surface extending along the non-holding surface.

With the operating device according to the fifteenth aspect, it is possible to further utilize a dead space.

In accordance with a sixteenth aspect of the present invention, the operating device according to any one of the first to fifteenth aspects further comprises a braking mechanism configured to actuate a brake device of the human powered vehicle in response to an operation of the operating member.

With the operating device according to the sixteenth aspect, it is possible to arrange the power storage in a dead space of the brake operating member.

In accordance with a seventeenth aspect of the present invention, the operating device according to any one of the first to fifteenth aspects further comprises a hydraulic unit configured to generate a hydraulic pressure in response to the operation of the operating member.

With the operating device according to the seventeenth aspect, it is possible to operate at least one of various types of components in the human powered vehicle via the hydraulic unit.

In accordance with an eighteenth aspect of the present invention, the operating device according to any one of the first to seventeenth aspects further comprises an additional member movable with respect to the at least one of the base member and the operating member. The first location is defined in the additional member With the operating device according to the eighteenth aspect, it is possible to arrange the power storage in a dead space of the additional member. Further, since the power storage can be disposed in a different member from a member in which the electrical switch and the electric generator, it is possible to further flexibly design a size of the power storage.

In accordance with a nineteenth aspect of the present invention, the operating device according to the eighteenth aspect is configured so that the additional member is an additional operating member configured to be movably coupled to the operating member.

With the operating device according to the nineteenth aspect, it is possible to arrange the power storage in a dead space of the additional operating member. Further, since the power storage can be disposed in a different member from a member in which the electrical switch and the electric generator, it is possible to further flexibly design a size of the power storage.

In accordance with a twentieth aspect of the present invention, the operating device according to any one of the first to nineteenth aspects is configured so that the operation signal is a signal for operating a shifting device to change a gear ratio of the human powered vehicle.

With the operating device according to the twentieth aspect, it is possible to arrange the power storage in a dead space. Further, since the power storage can be disposed in a different member from a member in which the electrical switch and the electric generator, it is possible to further flexibly design a size of the power storage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
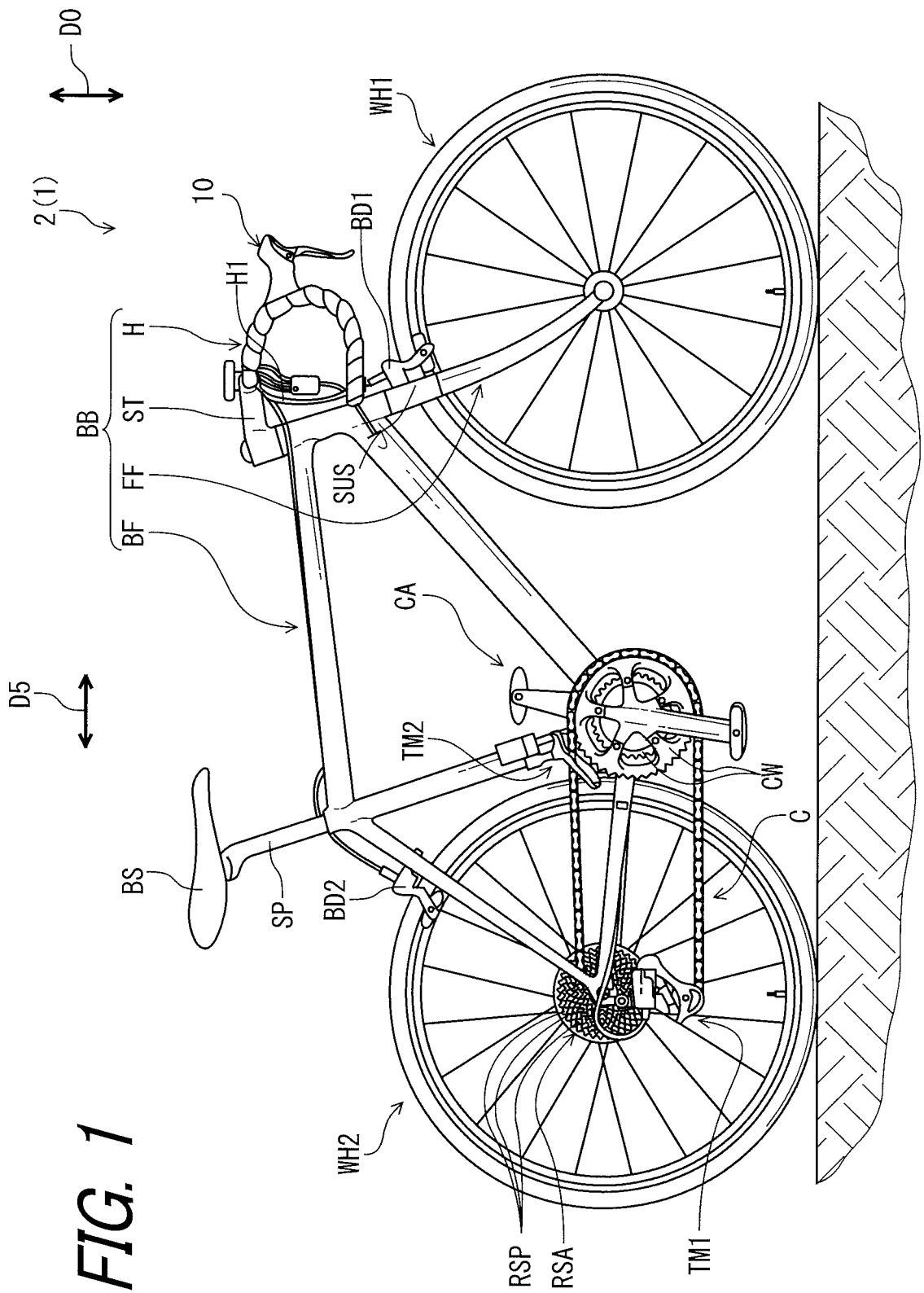
FIG. 1 is a side elevational view of a bicycle equipped with an operating device in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle 2 as an example of a human powered vehicle 1 includes an operating device 10 in accordance with a first embodiment. The human powered vehicle 1 is a vehicle to travel with a motive power including at least a human power of a rider who rides the human powered vehicle 1. The human powered vehicle 1 has an arbitrary number of wheels. For example, the human powered vehicle 1 has either one, two, three, four, or more than five wheels. In this embodiment, the human powered vehicle 1 has a smaller size than that of a four-wheeled automobile, but the human powered vehicle 1 can have an arbitrary size. For example, the human powered vehicle 1 can be larger than the four-wheeled automobile. The human powered vehicles 1 include the bicycle 2, a tricycle, and a kick scooter. While the bicycle 2 is illustrated as a road bike, the operating device 10 can be applied to a mountain bike or any type of bicycle.

As seen in FIG. 1, the bicycle 2 includes a bicycle body BB, a crank assembly CA, a rear sprocket assembly RSA, a saddle BS, a seatpost SP, and a bicycle chain C. The bicycle body BB includes a bicycle frame BF, a handlebar H, a stem ST, and a front fork FF. The handlebar H is coupled to the front fork FF via the stem ST. The crank assembly CS includes a plurality of chain wheels CW arranged in a transverse direction of the bicycle body BB. The rear sprocket assembly RSA includes a plurality of sprockets RSP arranged in the transverse direction. In the illustrated embodiment, the crank assembly CA includes two of the chain wheels CW, and the rear sprocket assembly RSA includes eleven of the sprockets RSP. The bicycle chain C engages with one of the chain wheels CW and one of the sprockets RSP. The saddle BS is attached to the bicycle body BB via the seatpost SP.

The bicycle 2 includes a first shifting device TM1 and a second shifting device TM2. The first shifting device TM1 is configured to shift the bicycle chain C between the sprockets RSP. The second shifting device TM2 is configured to shift the bicycle chain C between the chain wheels CW. While the first shifting device TM1 is a rear derailleur and the second shifting device TM2 is a front derailleur in the illustrated embodiment, any type of bicycle shifting device can be applied to the first shifting device TM1 and the second shifting device TM2.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on the saddle BS of the bicycle 2 with facing the handlebar H. Accordingly, these terms, as utilized to describe bicycle components, should be interpreted relative to the bicycle 2 equipped with the bicycle components as used in an upright riding position on a horizontal surface.

Figure 2:
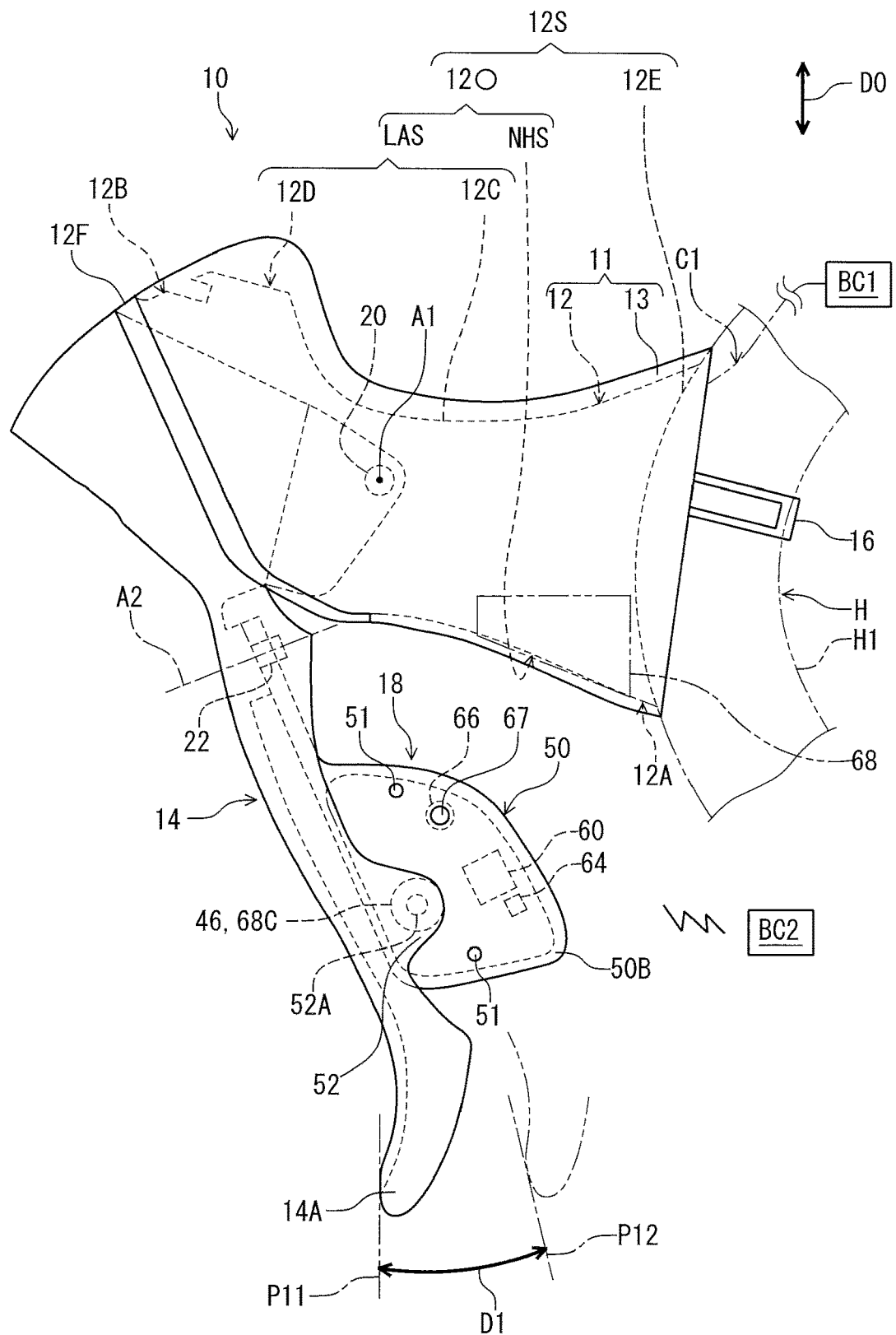
FIG. 2 is a side elevational view of an operating device in accordance with a first embodiment.

As seen in FIG. 2, the operating device 10 is configured to be mounted to the handlebar H. In this embodiment, the operating device 10 is configured to be mounted to a drop-down handlebar. However, structures of the operating device 10 can be applied to other operating devices mounted to other type of handlebars such as a flat handlebar, a time trial handlebar, and a bull horn handlebar. The handlebar H can also be referred to as the drop-down handlebar H.

The operating device 10 is operatively coupled to a bicycle component BC1 such as a hydraulic brake (e.g. a first brake device BD1, a second brake device BD2 (FIG. 1)), a hydraulic shifting device (e.g. TM1 or TM2), a hydraulic suspension (e.g. SUS (FIG. 1)), and an adjustable seatpost (e.g. SP). In this embodiment, the operating device 10 is operatively coupled to the bicycle component BC1 via a hydraulic hose C1.

Furthermore, the operating device 10 is operatively connected to an additional component BC2 via wireless communication. Examples of the additional component BC2 include an electric shifting device (e.g., a derailleur or an internal-gear hub), an electric suspension, an electric seatpost (e.g. SP) and a digital device (e.g., a cycle computer, a cell phone or a music player). In this embodiment, the operating device 10 is operatively connected to an electric shifting device provided as the additional component BC2 via wireless communication. The additional component BC2 can also be referred to as an electrical bicycle component BC2.

In this embodiment, the operating device 10 is a right hand side control device configured to be operated by the rider's right hand to actuate the bicycle component BC1 and the additional component BC2. However, the structures of the operating device 10 can be applied to a left hand side control device.

As seen in FIG. 2, the operating device 10 for the human powered vehicle comprises a base section 11. The base section 11 includes a base member 12 and a cover 13. The cover 13 covers at least part of the base member 12. Accordingly, the operating device 10 for the human powered vehicle 1 comprises a base member 12. Further, the operating device 10 comprises an operating member 14 configured to be movably coupled to the base member 12. The base member 12 is made of a metallic material (e.g., aluminum) or a non-metallic material (e.g., a resin material). The operating member 14 is made of a metallic material (e.g., aluminum) or a non-metallic material (e.g., a resin material). The cover 13 is made of a material different from the material of the base member 12. For example, the cover 13 is made of an elastic material such as rubber. The base member 12 is configured to be attached to the human powered vehicle 1. More specifically, the base member 12 includes a first end 12A to be mounted to a bicycle handlebar (e.g., a curved part H1) and a second end 12B opposite to the first end 12A. The base member 12 extends between the first end 12A and the second end 12B. The operating device 10 further comprises a mounting clamp 16 to be coupled to the handlebar H. The mounting clamp 16 is attached to the first end 12A of the base member 12 to couple the first end 12A to the handlebar H.

Figure 3:
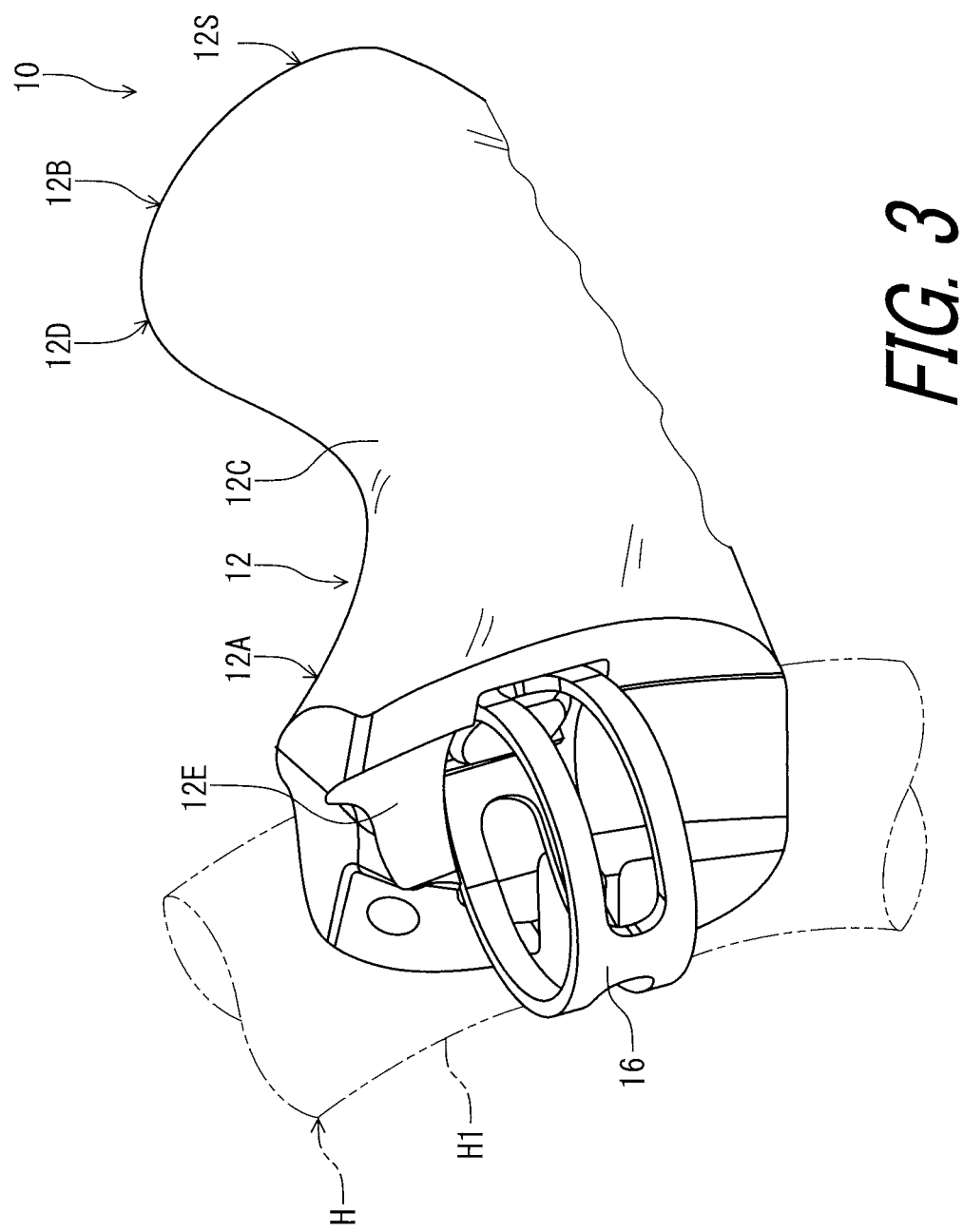
FIG. 3 is a partial perspective view of the operating device illustrated in FIG. 2.

As seen in FIG. 2, the base member 12 includes a surface 12S. As seen in FIG. 3, the mounting clamp 16 has an annular shape. The surface 12S of the base member 12 includes a mounting surface 12E disposed at the first end 12A. The mounting surface 12E has a curved shape corresponding to the drop-down handlebar H. Specifically, the mounting surface 12E has the curved shape corresponding to an outer peripheral surface of the curved part H1. The surface of the base member 12 includes an outer surface 12O other than the mounting surface 12E. At least a part of the outer surface 12O is covered by the cover 13. The remaining part of the outer surface 12O is exposed to the outside in a mounting state where the operating device 10 is mounted to the handlebar H.

As seen in FIG. 2, the base member 12 includes an end surface 12F provided at the second end 12B. The end surface 12F is farthest from the mounting surface 12E in the base member 12. The base member 12 includes a grip portion 12C arranged between the first end 12A and the second end 12B. A user applies force to the grip portion 12C upon operation of the operating member 14. The base member 12 includes a pommel portion 12D disposed at the second end 12B. The pommel portion 12D extends obliquely upward from the grip portion 12C. For example, the pommel portion 12D is disposed at a position higher than a position of the first end 12A in the mounting state of the operating device 10. The pommel portion 12D can also be configured to be graspable if needed and/or desired. Thus, a user applies a load to the grip portion 12C and the pommel portion 12D. Accordingly, the grip portion 12C and the pommel portion 12D can be referred to as a load applied surface LAS. The outer surface 12O of the base member 12 has a load applied surface LAS to which a user applies a load. In addition, the outer surface 12O of the base member 12 has a non-holding surface NHS opposite to the load applied surface LAS in a height direction D0 of the bicycle 2 in the mounting state of the operating device 10.

Figure 4:
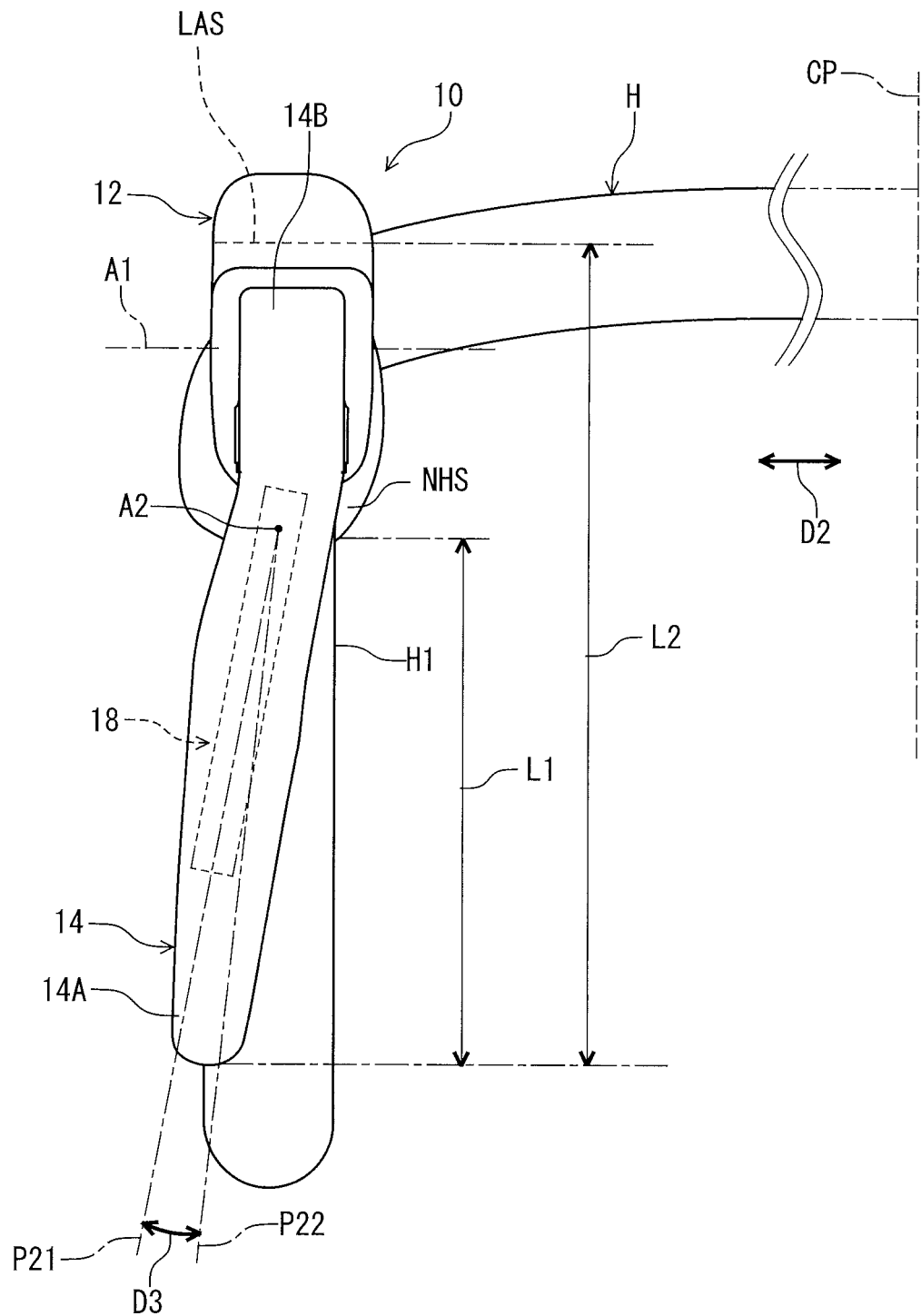
FIG. 4 is a front view of the operating device illustrated in FIG. 2.

As seen in FIG. 2, the operating member 14 is pivotally coupled to the base member 12 about a first pivot axis A1. The operating member 14 is pivotable relative to the base member 12 between a first rest position P11 and a first operated position P12 in a first operating direction D1. The operating member 14 is provided as a brake operating lever pivotable about the first pivot axis A1. The first operating direction D1 is a circumferential direction defined about the first pivot axis A1. The operating member 14 has a free end 14A farthest from the first pivot axis A1 in the operating member 14 when viewed from a first direction D2 (FIG. 4) parallel to the first pivot axis A1. As seen in FIG. 4, a first distance L1 between the free end 14A of the operating member 14 and the non-holding surface NHS is shorter than a second distance L2 between the free end 14A of the operating member 14 and the load applied surface LAS. Briefly speaking, the first distance L1 between the operating member 14 and the non-holding surface NHS is shorter than the second distance L2 between the operating member 14 and the load applied surface LAS.

As seen in FIG. 4, the operating device 10 further comprises an additional operating member 18 movably coupled to the operating member 14. In this embodiment, the additional operating member 18 is pivotally coupled to the operating member 14 about a second pivot axis A2. In other words, the additional operating member 18 is movably mounted relative to the base member 12. The additional operating member 18 is pivotable relative to the operating member 14 between a second rest position P21 and a second operated position P22 in a second operating direction D3 different from the first operating direction D1. In this embodiment, the second operating direction D3 is a circumferential direction defined about the second pivot axis A2. The additional operating member 18 can be directly movably coupled to the base member 12.

In the present application, the term "rest position" as used herein refers to a position at which a movable part such as the operating member 14 and the additional operating member 18 remains stationary in a state where the movable part is not operated by the user. The term "operated position" as used herein refers to a position at which the movable part has been operated by the user to perform the operation of the bicycle component.

Figure 5:
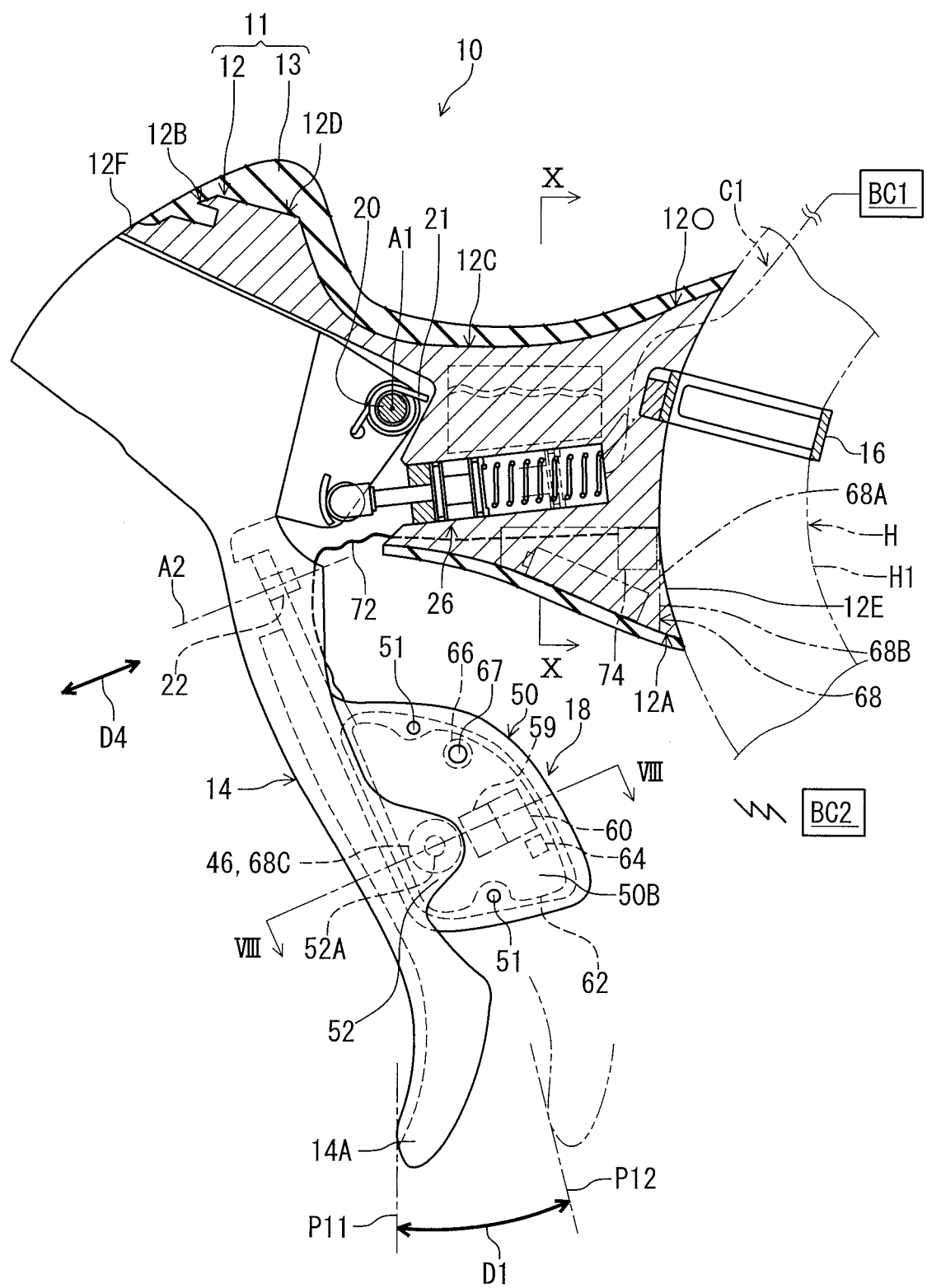
FIG. 5 is a side elevational view of the operating device illustrated in FIG. 2 with a cross-section of a base member.

As seen in FIG. 5, the operating device 10 further comprises a first pivot shaft 20 pivotally coupling the operating member 14 to the base member 12 about the first pivot axis A1. The first pivot shaft 20 defines the first pivot axis A1. The operating member 14 is biased by a first biasing member 21 toward the first rest position P11 relative to the base member 12. Thus, the operating member 14 is at the first rest position P11 in a state where the operating member 14 is not operated by the user.

The operating device 10 further comprises a second pivot shaft 22 pivotally coupling the additional operating member 18 to the operating member 14 about the second pivot axis A2. The second pivot shaft 22 defines the second pivot axis A2. The second pivot shaft 22 is secured to the operating member 14. Thus, the additional operating member 18 is pivotable together with the operating member 14 relative to the base member 12 about the first pivot axis A1 in the first operating direction D1.

The second pivot axis A2 is disposed below the first pivot axis A1 in the mounting state of the operating device 10. The second pivot shaft 22 is disposed below the first pivot shaft 20 in the mounting state of the operating device 10. However, the positional relationship between the first pivot axis A1 and the second pivot axis A2 is not limited to this embodiment. The positional relationship between the first pivot shaft 20 and the second pivot shaft 22 is not limited to this embodiment.

Figure 6:
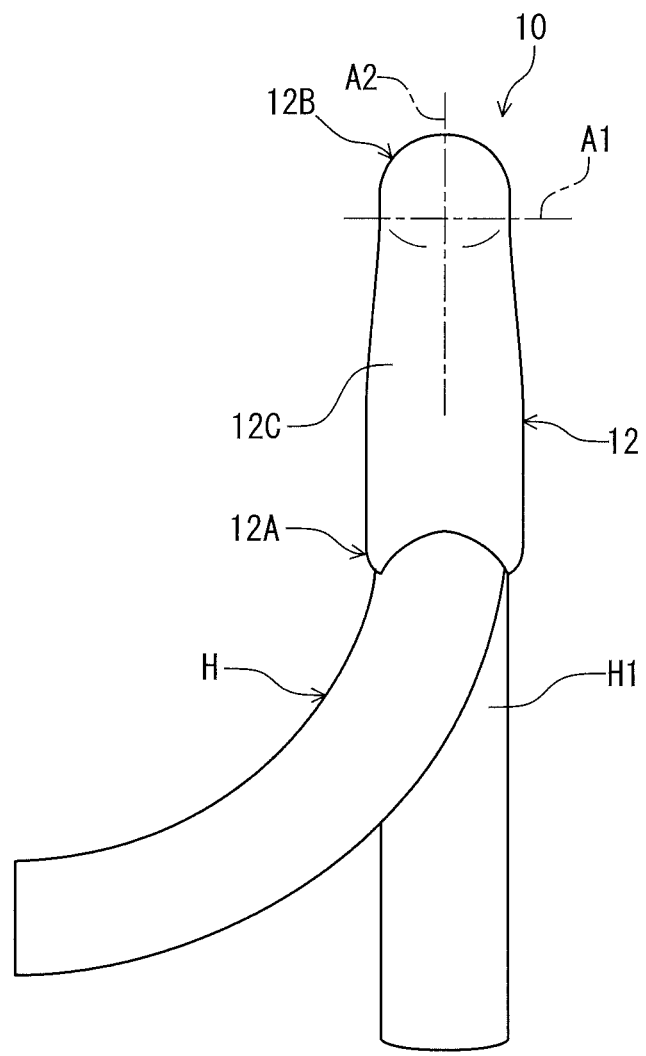
FIG. 6 is a top view of the operating device illustrated in FIG. 2.

As seen in FIG. 6, the second pivot axis A2 is non-parallel to the first pivot axis A1. Specifically, the second pivot axis A2 is perpendicular to the first pivot axis A1 when viewed from above the operating device 10 in the mounting state of the operating device 10. However, the second pivot axis A2 can be inclined relative to the first pivot axis A1 when viewed from above the operating device 10 in the mounting state of the operating device 10.

While the additional operating member 18 is used as a shift operating member in this embodiment, the additional operating member 18 can be used as an operating member other than the shift operating member. For example, the additional operating member 18 can be used as a suspension operating member in a case where the electrical bicycle component includes the electric suspension (e.g. SUS). The additional operating member 18 can be used as a seatpost operating member in a case where the electrical bicycle component includes the electric seatpost (e.g. SP).

As seen in FIG. 4, the operating member 14 has a curved shape when viewed from a second direction D4 (FIG. 5) parallel to the second pivot axis A2. The free end 14A is offset from a proximal end 14B of the operating member 14 in the first direction D2. However, the operating member 14 can have a straight shape extending from the proximal end 14B to the free end 14A when viewed from the second direction D4. In such an embodiment, the second rest position P21 of the additional operating member 18 is adjusted toward a transverse center plane CP of a bicycle. The transverse center plane CP is defined as a center plane of the handlebar H or a bicycle frame of the bicycle in a transverse direction of the bicycle in the upright riding position.

Figure 7:
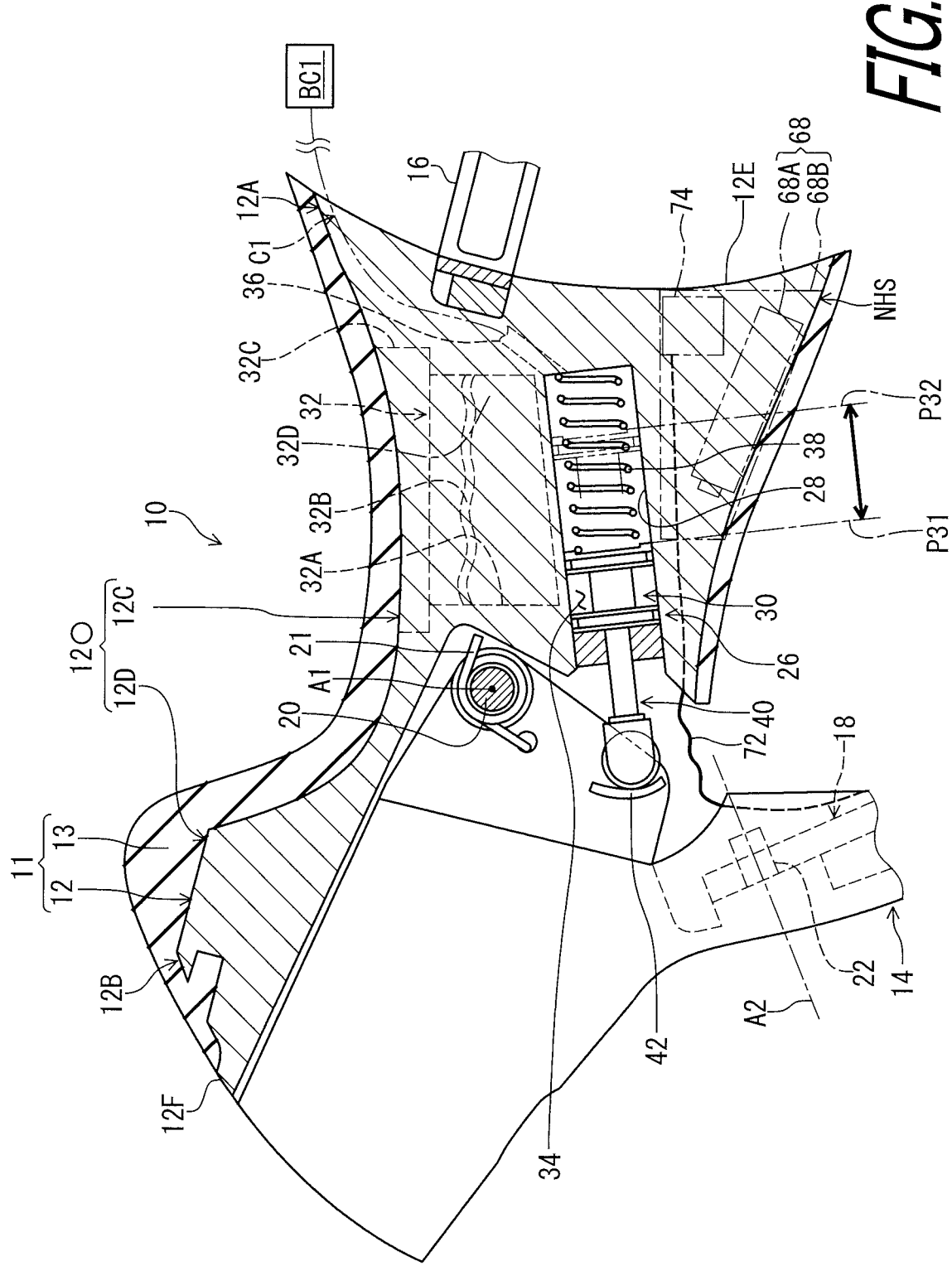
FIG. 7 is a partial cross-sectional view of the operating device illustrated in FIG. 1.

As seen in FIG. 7, the operating device 10 further comprises a hydraulic unit 26 configured to generate a hydraulic pressure in response to an operation of the operating member 14. The hydraulic unit 26 is coupled to the operating member 14 to operate the bicycle component BC1 in response to a pivotal movement of the operating member 14 relative to the base member 12. Typically, the bicycle component BC1 is a hydraulic brake BD1, BD2, thereby the hydraulic unit 26 can be referred to as a braking mechanism 26 configured to actuate a brake device BD1, BD2 of the human powered vehicle 1 in response to an operation of the operating member 14. That is, the operating device 10 further comprises the braking mechanism 26. In this embodiment, the braking mechanism 26 is a hydraulic braking mechanism, but in place of the hydraulic unit 26, the operating device 10 can include a mechanical braking mechanism including a conventional cable operating structure to move a mechanical control cable connected to a brake device BD1, BD2 in response to the operation of the operating member 14. Further, as described above, the hydraulic unit 26 can be configured to operate the hydraulic shifting device (e.g. TM1 or TM2), the hydraulic suspension (e.g. SUS (FIG. 1)), or the adjustable seatpost (e.g. SP) as the bicycle component BC1.

The hydraulic unit 26 comprises a cylinder bore 28, a piston 30, and a hydraulic reservoir 32. The piston 30 is movably provided in the cylinder bore 28. The hydraulic reservoir 32 is connected to the cylinder bore 28. The piston 30 is movable relative to the cylinder bore 28 between an initial position P31 and an actuated position P32. The cylinder bore 28 and the piston 30 define a hydraulic chamber 34. The hydraulic reservoir 32 is connected to the hydraulic chamber 34. The hydraulic chamber 34 is connected to the bicycle component BC1 via the hydraulic hose C1. The base member 12 includes a fluid passageway 36. The hydraulic chamber 34 is connected to the hydraulic hose C1 via the fluid passageway 36. For example, the hydraulic reservoir 32 includes a recess (an opening) 32A, a diaphragm 32B, and a lid 32C. The recess 32A is provided in the base member 12. The diaphragm 32B is provided in the recess 32A. The lid 32C is attached to the base member 12 to cover the recess 32A. A reservoir chamber 32D is defined by the recess 32A and the diaphragm 32B. The reservoir chamber 32D is connected to the hydraulic chamber 34 via at least one connection hole (not shown).

The hydraulic unit 26 includes a return spring 38 and a piston rod 40. The return spring 38 is provided in the hydraulic chamber 34 to bias the piston 30 toward the initial position P31. The piston rod 40 is operatively coupled to the piston 30. The operating member 14 includes a guide 42 to transmit a pivotal movement of the operating member 14 to the piston rod 40. The return spring 38 biases the piston rod 40 toward the guide 42. The piston rod 40 is in slidable contact with the guide 42.

The hydraulic unit 26 is at least partly disposed in the base member 12. In this embodiment, the hydraulic unit 26 is entirely disposed in an outline of the base member 12 when viewed from the first direction D2. However, the hydraulic unit 26 can be partly disposed in the base member 12. For example, at least one of the piston 30 and the hydraulic reservoir 32 can be partly disposed at another member (e.g., the operating member 14 or the additional operating member 18) which is a separate member from the base member 12. Furthermore, the cylinder bore 28 is provided in the base member 12. However, the cylinder bore 28 can be provided in another member (e.g., the operating member 14 or the additional operating member 18) which is a separate member from the base member 12.

As seen in FIG. 5, the operating device 10 comprises an electrical switch 46. The electrical switch 46 is configured to be activated by an input operation from a user. The electrical switch 46 is provided on a first location. More specifically, the electrical switch 46 is disposed at the additional operating member 18 to be activated by the input operation from the user. The electrical switch 46 is attached to the additional operating member 18 to be activated in response to a pivotal movement of the additional operating member 18 relative to the operating member 14. However, the electrical switch 46 can be disposed at a different member from the additional operating member 18. The operating device 10 further comprises an additional member (e.g. the additional operating member 18) movable with respect to the at least one of the base member 12 and the operating member 14. The additional member (e.g. the additional operating member 18) is movable with respect to the at least one of the base member 12 and the operating member 14 without separating from the operating device 10 in the mounting state of the operating device 10. More specifically, the additional operating member 18 is movable with respect to the base member 12 without separating from the operating device 10 in the mounting state of the operating device 10. The first location is defined in the additional member. More specifically, the additional member is the additional operating member 18. The first position is defined in the additional operating member 18. In a case where the additional member is not the additional operating member 18, the additional operating member 18 can be omitted from the operating device 10. While the electrical switch 46 is a normally open switch in this embodiment, other type of switches can be applied to the operating device 10.

While the electrical switch 46 are used as a shift control switch in this embodiment, at least one of the electrical switch 46 can be used as a switch other than the shift control switch. For example, the additional operating member 18 can be used as a suspension control switch in a case where the additional component BC2 includes the electric suspension SUS. The additional operating member 18 can be used as a seatpost control member in a case where the additional component BC2 includes the electric seatpost (e.g. SP).

Figure 8:
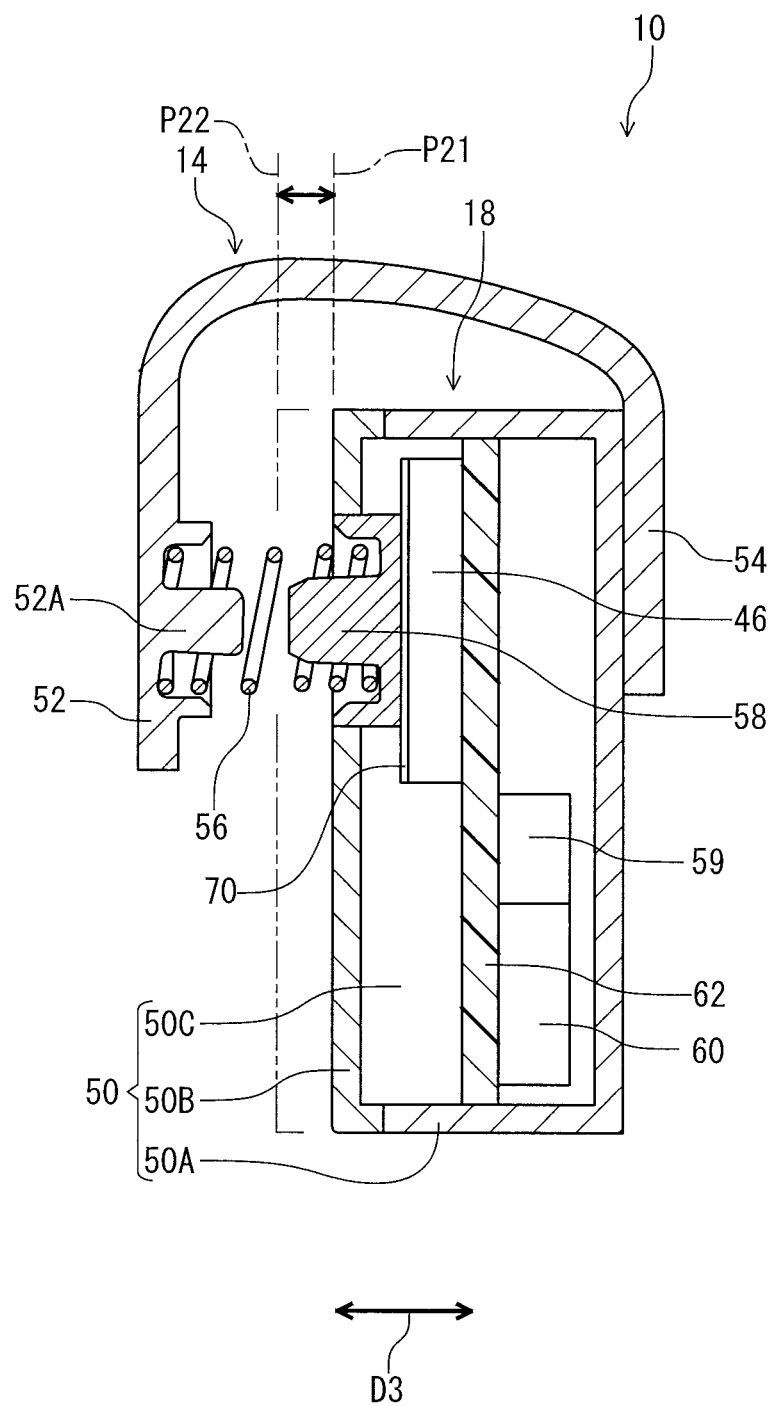
FIG. 8 is a cross-sectional view of the operating device taken along line VIII-VIII of FIG. 5.

As seen in FIGS. 5 and 8, the operating device 10 further comprises a housing 50. More specifically, the additional operating member 18 includes a housing 50. The electrical switch 46 is attached to the housing 50. In other words, the housing 50 accommodates the electrical switch 46. The housing 50 includes an attachment base 50A and a cover 50B. The cover 50B is detachably attached to the attachment base 50A with fasteners 51 such as screws. An internal space 50C is defined by the attachment base 50A and the cover 50B. The internal space 50C is sealed by seal members (not shown) in a state where the cover 50B is attached to the attachment base 50A. The electrical switch 46 is disposed in the internal space 50C of the housing 50.

The term "detachably mounted" or "detachably mounting", as used herein, encompasses configurations in which an element directly secured to another element by directly affixing the element to the other element while the element is detachable from the other element without substantial damage; and configurations in which the element is indirectly secured to the other element via intermediate member(s) while the element is detachable from the other element and the intermediate member(s) without substantial damage. This concept also applies to words of similar meaning, for example, "detachably attached", "detachably joined", "detachably connected", "detachably coupled", "detachably secured", "detachably bonded", "detachably fixed" and their derivatives.

As seen in FIG. 8, the operating member 14 includes an actuation part 52 disposed to face the electrical switch 46 to press the electrical switch 46 in response to the movement of the additional operating member 18 in the second operating direction D3 relative to the operating member 14. The actuation part 52 can be disposed at the base member 12.

The actuation part 52 includes a projection 52A to face the electrical switch 46. The operating member 14 includes a receiving part 54. The receiving part 54 is spaced part from the actuation part 52 in the second operating direction D3. The electrical switch 46 and the housing 50 are disposed between the actuation part 52 and the receiving part 54 in the second operating direction D3. The additional operating member 18 is contactable with the receiving part 54. The additional operating member 18 is positioned at the second rest position P21 by the receiving part 54 in a state where the additional operating member 18 is in contact with the receiving part 54.

The operating device 10 comprises a switch biasing member 56. The switch biasing member 56 is disposed between the electrical switch 46 and the actuation part 52 to bias the additional operating member 18 toward the second rest position P21. Thus, the additional operating member 18 is positioned at the second rest position P21 by the receiving part 54 in a state where the additional operating member 18 is not operated by the user.

As seen in FIG. 8, the operating device 10 comprise a button element 58 to transmit, to the electrical switch 46, the movement of the additional operating member 18 in the second operating direction D3 relative to the operating member 14. The button element 58 is disposed at the housing 50 to face the actuation part 52 in the second operating direction D3. Specifically, the button element 58 is disposed to face the projection 52A in the second operating direction D3. In this embodiment, the switch biasing member 56 includes a coil spring. The switch biasing member 56 is held by the projection 52A and the button element 58.

The button element 58 is in contact with the projection 52A in a state where the additional operating member 18 is at the second operated position P22. This contact closes the electrical switch 46 to be activated by the input operation. The electrical switch 46 is open not to be activated by the input operation in a state where the additional operating member 18 is at the second rest position P21.

Figure 9:
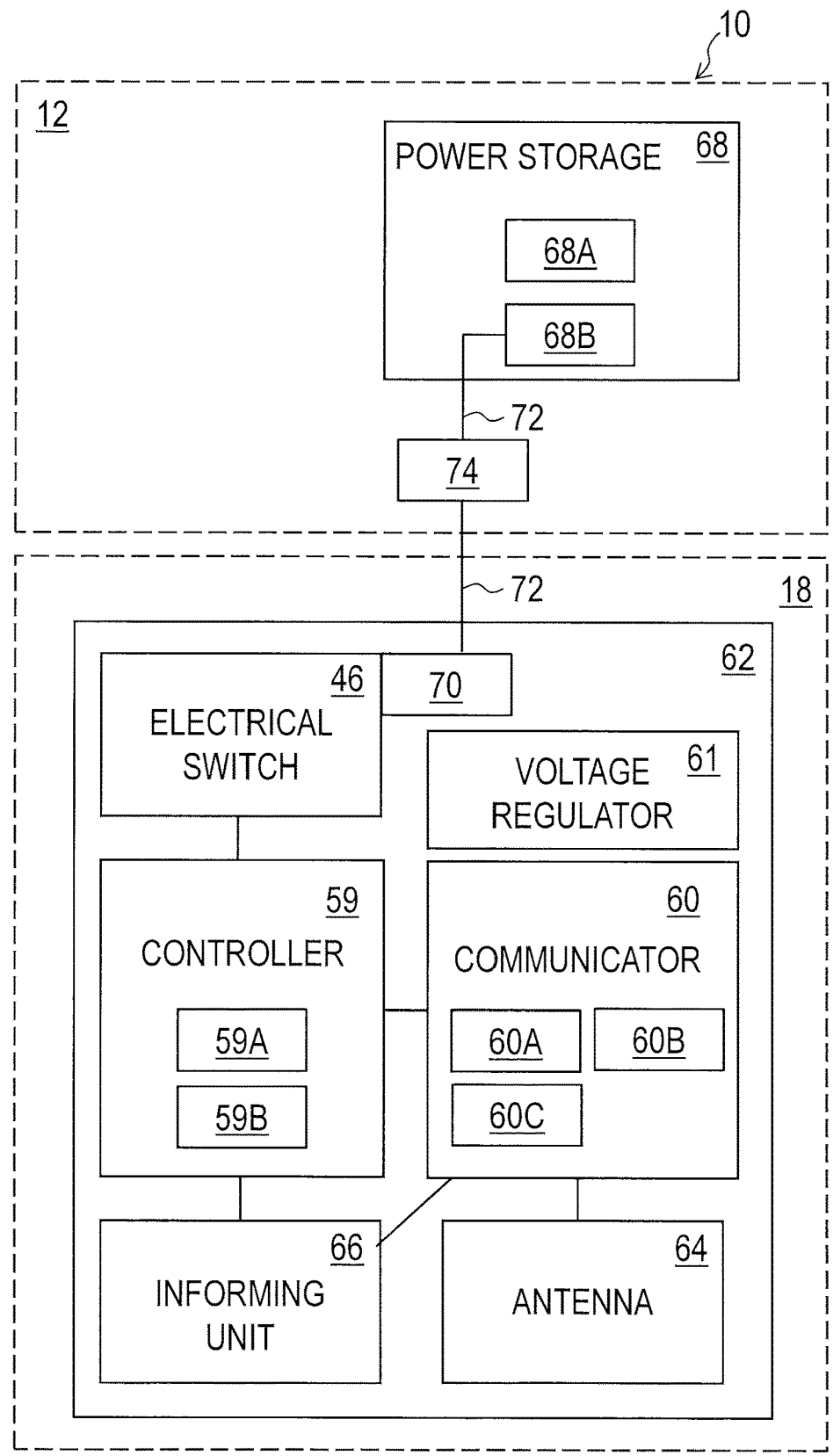
FIG. 9 is a schematic block diagram of the operating device illustrated in FIG. 2.

As seen in FIG. 5, the operating device 10 comprises a controller 59 configured to generate an operation signal in response to an operation of the electrical switch 46. Typically, the operation signal is a signal for operating a shifting device (e.g. TM1, TM2) to change a gear ratio of the human powered vehicle 1. In this embodiment, the gear ratio is defined as a total number of teeth of one of the chain wheels CW with which the bicycle chain C engages divided by a total number of teeth of one of the sprockets RSP with which the bicycle chain C engages. The controller 59 is electrically connected to the electrical switch 46. In this embodiment, as seen in FIG. 9, the controller 59 includes a processor 59A and a memory 59B. Thus, the controller 59 can also be referred to as a control circuitry 59 in the present application. The processor 59A includes a central processing unit (CPU) and a memory controller. The memory 59B is connected to the processor 59A. The memory 59B includes a read only memory (ROM) and a random access memory (RAM). The ROM includes a non-transitory computer-readable storage medium. The RAM includes a transitory computer-readable storage medium. The memory 59B includes storage areas each having an address in the ROM and the RAM. The processor 59A controls the memory 59B to store data in the storage areas of the memory 59B and reads data from the storage areas of the memory 59B. The memory 59B (e.g., the ROM) stores a program. The program is read into the processor 59A, and thereby functions of the controller 59 (e.g., at least part of functions of generating operation signal and controlling a communicator 60, which is described hereinafter).

As seen in FIG. 5, the operating device 10 further comprises the communicator 60 to wirelessly transmit the operation signal generated by the controller 59. The communicator 60 is electrically connected to the controller 59 to wirelessly transmit the operation signal to the additional component BC2 in response to the input operation. The controller 59 and the communicator 60 can be integrated into a single device but can separate from each other. The controller 59 and communicator 60 are disposed at one of the base member 12, the operating member 14, and the additional operating member 18. In this embodiment, the controller 59 and the communicator 60 are disposed at the additional operating member 18. However, the controller 59 and the communicator 60 can be disposed at one of the base member 12 and the operating member 14.

As seen in FIG. 8, the controller 59 and communicator 60 are attached to the additional operating member 18. In this embodiment, the controller 59 and the communicator 60 are integrally provided with the electrical switch 46 as a single unit. The operating device 10 comprises a substrate 62. The electrical switch 46, the controller 59, and the communicator 60 are mounted on the substrate 62 and electrically connected to each other via the substrate 62. The substrate 62 is secured to the additional operating member 18 (e.g., the housing 50).

As seen in FIGS. 5 and 9, the operating device 10 comprises an antenna 64 connected to the communicator 60. The antenna 64 is mounted on the substrate 62. The communicator 60, the substrate 62, and the antenna 64 are disposed in the internal space 50C of the housing 50. The communicator 60 wirelessly transmits the wireless signal based on the input operation via the antenna 64. The antenna 64 can be included in the communicator 60 or can be integrally provided with the communicator 60 as a single module or unit.

In this embodiment, as seen in FIG. 9, the communicator 60 includes a signal generating circuit 60A, a signal transmitting circuit 60B, and a signal receiving circuit 60C. Thus, the communicator 60 can also be referred to as a wireless communication circuitry 60 in the present application.

The signal generating circuit 60A is configured to generate a wireless signal based on the operation signal generated by the controller 59 in response to the input operation received by the electrical switch 46. The signal generating circuit 60A superimposes digital signals on carrier wave using a predetermined wireless communication protocol to generate the wireless signals. The signal transmitting circuit 60B is configured to transmit the wireless signal via the antenna 64 in response to the input operation received by the electrical switch 46. In this embodiment, the signal generating circuit 60A can encrypt control information (e.g., shift information) to generate encrypted wireless signals. The signal generating circuit 60A can be configured to encrypt digital signals stored in the memory 59B using a cryptographic key. The signal transmitting circuit 60B can be configured to transmit the encrypted wireless signals. Thus, typically, the communicator 60 is configured to wirelessly transmit the wireless signal to upshift or downshift the additional component BC2 when the electrical switch 46 is closed to be activated by the input operation.

Further, the signal receiving circuit 60C is configured to receive a wireless signal from the additional component BC2 via the antenna 64. In this embodiment, the signal receiving circuit 60C is configured to decode the wireless signal to recognize information wirelessly transmitted from the additional component BC2. The signal receiving circuit 60C may decrypt the encrypted wireless signal using the cryptographic key. Namely, the communicator 60 is configured to transmit a wireless signal to control other electrical bicycle components than shifting devices TM1, TM2 and to receive a wireless signal to recognize information from other electrical bicycle components than shifting devices TM1, TM2. In other words, the communicator 60 is provided as a wireless transmitter and a wireless receiver. The other electrical bicycle components can include the electric suspension (e.g. SUS) and the electric seatpost (e.g. SP). In this embodiment, the communicator 60 is integrally provided as a single module or unit. However, the communicator 60 can be constituted of a wireless transmitter and a wireless receiver which are provided as separate modules or units arranged at different positions from each other. The signal receiving circuit 60C can be omitted from the communicator 60.

As seen in FIGS. 5 and 9, the operating device 10 further comprises an informing unit 66. The informing unit 66 is electrically connected to at least one of the controller 59 and the communicator 60 to inform a user of a status of at least one of the controller 59 and the communicator 60. The informing unit 66 is disposed on at least one of the base member 12, the operating member 14, and the additional operating member 18. In this embodiment, the informing unit 66 is disposed on the additional operating member 18. However, the informing unit 66 can be disposed on at least one of the base member 12 and the operating member 14 instead of or in addition to on the additional operating member 18. Examples of the status of the communicator 60 include a signal transmission status and a power storage status.

As seen in FIG. 9, the informing unit 66 is mounted on the substrate 62. The informing unit 66 is disposed in the internal space 50C of the housing 50. The informing unit 66 is electrically connected to the controller 59 and the communicator 60 via the substrate 62. The informing unit 66 includes a light emitting element such as a light emitting diode (LED). However, the informing unit 66 can include other elements such as a buzzer instead of or in addition to the light emitting element. Light from the informing unit 66 is visible from outside of the operating device 10 via a clear window 67 (FIG. 5).

As seen in FIG. 9, the operating device 10 comprises a power storage 68. The power storage 68 is electrically connected to the controller 59 and the communicator 60. The power storage 68 is configured to supply electrical power to the controller 59. The power storage 68 is configured to supply electrical power to the communicator 60. In this embodiment, the power storage 68 is electrically connected to the controller 59 and the communicator 60 to supply electric energy (e.g., a power source voltage) to the controller 59 and the communicator 60. The power storage 68 supplies the electric energy to other elements via the controller 59 and the communicator 60. However, the power storage 68 can be electrically connected to the other elements without via the controller 59 and the communicator 60.

The power storage 68 is provided on a second location different from the first location. The second location is defined on at least one of the operating member 14 and the surface 12S of the base member 12. The power storage 68 is provided on the second location such that the at least part of the power storage 68 is not covered by the at least one of the base member 12 and the operating member 14. In the first embodiment, the second location is defined on the surface 12S of the base member 12. More specifically, as seen in FIGS. 2, 5, and 7, the power storage 68 is provided on the non-holding surface NHS.

Figure 10:
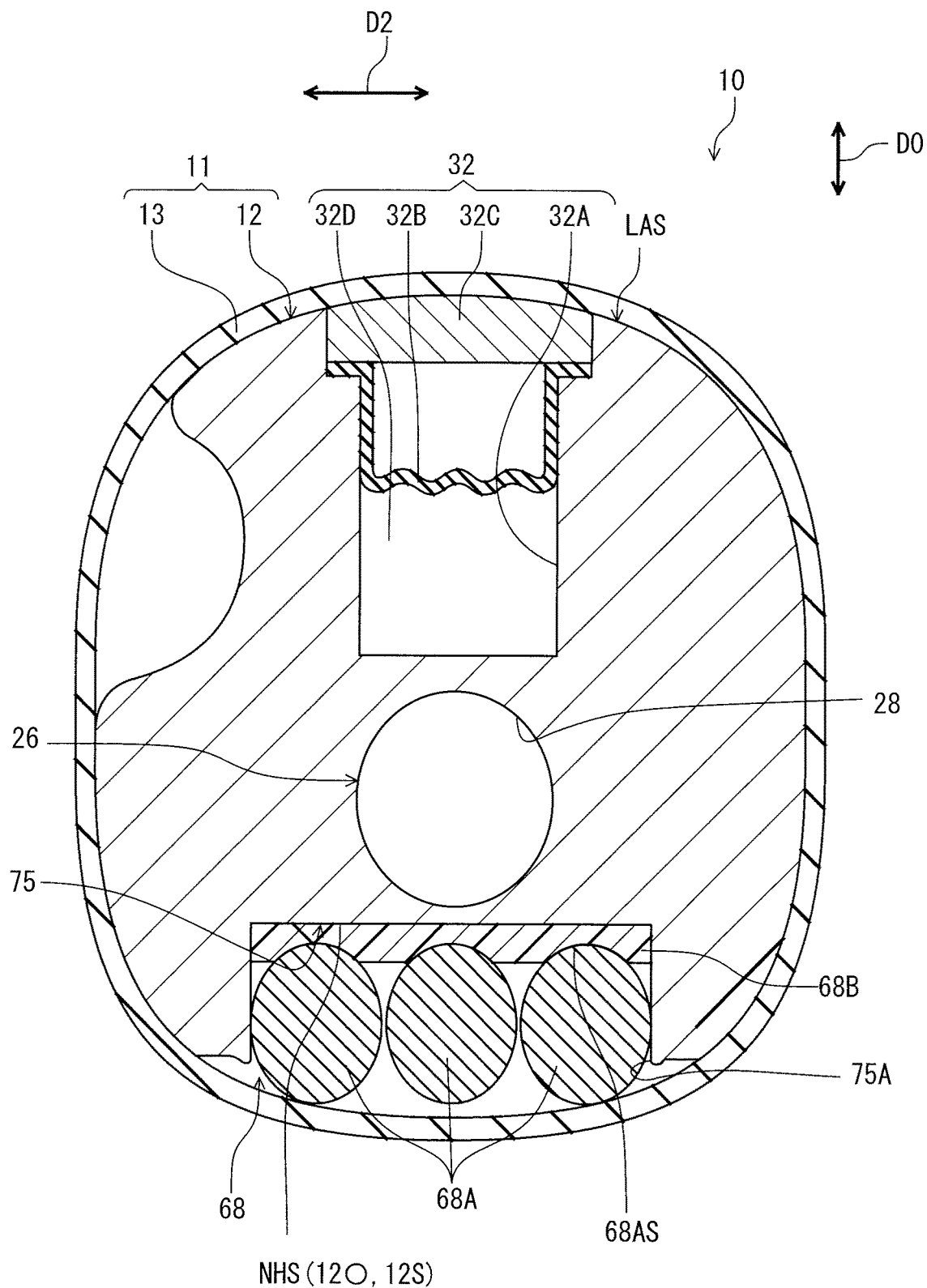
FIG. 10 is a cross-sectional view of the operating device taken along line X-X of FIG. 5.

In this embodiment, the power storage 68 includes a battery 68A and a battery holder 68B. The battery 68A is detachably mounted to the battery holder 68B. Examples of the battery 68A include a primary battery 68A such as a lithium manganese dioxide battery, and a secondary battery such as a lithium-ion secondary battery or a capacitor. In this embodiment, the battery 68A is a secondary battery. As seen in FIGS. 5, 7, and 10, the battery 68A and the battery holder 68B are disposed in the base member 12. The battery holder 68B is secured to the base member 12. In the illustrated embodiment, the power storage 68 is provided on the outer surface 12O. However, the power storage 68 can be provided on an inner surface of the base member 12. In this case, the battery holder 68B can be provided on the inner surface of the base member 12.

As seen in FIGS. 8 and 9, the operating device 10 comprises an electric generator 70 configured to generate electric power in response to the operation of the electrical switch 46. The electric generator 70 is provided on the first location. As described above, in this embodiment, the first position is defined in the additional member. More specifically, the additional member is the additional operating member 18. The electric generator 70 is configured to generate the electric energy using pressure and/or vibration. In this embodiment, the electric generator 70 is configured to generate electric energy (e.g., alternating current) using pressure and/or vibration caused by a movement of at least one of the operating member 14, the additional operating member 18, and the button element 58. Examples of the electric generator 70 includes a piezoelectric element. The electric generator 70 is attached to the electrical switch 46 and is disposed between the electrical switch 46 and the button element 58. However, the electric generator 70 can be disposed at other positions. The electric generator 70 is electrically connected to the substrate 62. The electric generator 70 is electrically connected to the controller 59 and the communicator 60 via the substrate 62. As seen in FIG. 8, the housing 50 accommodates the electric generator 70. Accordingly, the housing 50 accommodates at least the electrical switch 46 and the electric generator 70. As seen in FIGS. 5 and 9, the power storage 68 is provided outside the housing 50. Since the operating device 10 further comprises an electric wiring 72 electrically connecting the power storage 68 to the electric generator 70, the power storage 68 is configured to store the electric power generated by the electric generator 70. As seen in FIG. 4, the electric wiring 72 electrically connects the communicator 60 and the power storage 68. The electric wiring 72 extends from the communicator 60 to the power storage 68 along the operating member 14 and/or the additional operating member 18. As seen in FIG. 9, the electric wiring 72 electrically connects the substrate 62 to the battery holder 68B.

As seen in FIGS. 7 and 9, the operating device 10 further comprises a rectifier 74 electrically arranged between the electric generator 70 and the power storage 68. In other words, the electric generator 70 is electrically connected to the power storage 68 via the rectifier 74. In this embodiment, the rectifier 74 is disposed at the base member 12. More specifically, as seen in FIG. 7, the electric generator 70 is disposed in the battery holder 68B and is electrically connected to the battery holder 68B. The rectifier 74 is configured to rectify the electric energy generated by the electric generator 70. Since the electric generator 70 and the rectifier 74 have been well known in the electronics field, they will not be described and/or illustrated in detail here for the sake of brevity. The rectifier 74 can be omitted from the operating device 10. The power source voltage is applied from the power storage 68 to the controller 59 and the communicator 60 via the electric wiring 72 or a different connection cable.

As seen in FIG. 9, the communicator 60 includes a voltage regulator 61. The voltage regulator 61 is configured to regulate the power source voltage to a level at which various circuits of the controller 59, the communicator 60, and the informing unit 66 can properly operate. The voltage regulator 61 is configured to supply the regulated voltage to the processor 59A, the memory 59B, the signal generating circuit 60A, the signal transmitting circuit 60B, the signal receiving circuit 60C, and the informing unit 66. The voltage regulator 61 can be provided in the power storage 68.

The voltage regulator 61 is configured to switch the power source voltage between the battery 68A and the electric generator 70. At first, for example, the communicator 60 preferentially uses the electric energy generated by the electric generator 70 to transmit the wireless signal based on the input operation received by the electrical switch 46. When the transmission of the wireless signal is completed using only the electric energy generated by the electric generator 70, the voltage regulator 61 interrupts supply of the electric energy from the battery 68A to reduce the standby power consumption of the battery 68A. When the transmission of the wireless signal is not completed due to insufficient electric energy, the communicator 60 uses the electric energy supplied from the battery 68A to transmit the wireless signal based on the input operation received by the electrical switch 46. The remaining electric energy generated by the electric generator 70 can be charged to a secondary battery 68A (not shown) if necessary. In such an embodiment, the secondary battery 68A is provided in the power storage 68 instead of or in addition to the battery 68A. Additionally or alternatively, an additional secondary battery such as a capacitor can be disposed on the substrate 62 to charge the remaining electric energy to supply the charged energy to at least one of the controller 59, the communicator 60, and the informing unit 66.

As seen in FIG. 10, the base member 12 includes an accommodation space 75 in which the power storage 68 is provided. In this embodiment, the power storage 68 is provided in the accommodation space 75. The electrical switch 46 and the electric generator 70 are provided outside the accommodation space 75. The accommodation space 75 includes an outer opening 75A.

As seen in FIG. 10, at least a part of the power storage 68 is provided between the outer surface 12O of the base member 12 and the cover 13 covering at least a part of the base member 12. The power storage 68 is disposed between the base member 12 and the cover 13 in the height direction D0 in the mounting state of the operating device 10. That is, the at least part of the power storage 68 is not covered by the at least one of the base member 12 and the operating member 14. More specifically, the at least part of the power storage 168 is not covered by the base member 12. The power storage 68 is at least partly disposed closer to the non-holding surface NHS than the load applied surface LAS in the height direction D0. The battery holder 68B has an attachment surface 68AS on which the battery 68A is provided. As seen in FIG. 10, the power storage 68 has the attachment surface 68AS extending along the non-holding surface NHS.

In this embodiment, the power storage 68 is partly disposed closer to the non-holding surface NHS than the hydraulic unit 26 in the height direction D0 in the mounting state of the operating device 10. The battery 68A, the battery holder 68B, and the rectifier 74 are disposed between the load applied surface LAS and the non-holding surface NHS in the height direction D0 in the mounting state of the operating device 10. The battery 68A, the battery holder 68B, and the rectifier 74 are closer to the non-holding surface NHS than the load applied surface LAS in the height direction D0 in the mounting state of the operating device. However, the communicator 60 can be disposed between the load applied surface LAS and the non-holding surface NHS in the height direction D0 in the mounting state of the operating device 10.

In the illustrated embodiment, the power storage 68 is only covered by the cover 13. However, the operating device 10 can further comprise an additional cover detachably attached to the base member 12 to at least partly cover the outer opening 75A of the accommodation space 75. The additional cover is made of a material different from the material of the base member 12. The additional cover can seal the accommodation space 75.

In the illustrated embodiment, each of the cylinder bore 28, the piston 30, and the hydraulic reservoir 32 does not overlap with the power storage 68 when viewed from the first direction D2. However, at least one of the cylinder bore 28, the piston 30, and the hydraulic reservoir 32 can partly overlap with the power storage 68 when viewed from the first direction D2.

Second Embodiment

A operating device 210 in accordance with a second embodiment will be described below referring to FIGS. 11 to 13. The operating device 210 has the same structure and/or configuration as those of the operating device 10 except for the arrangement of the power storage 68. In addition, the cover 13 can be omitted in this embodiment. Thus, elements having substantially the same function as those in the first embodiment will be numbered the same here and will not be described and/or illustrated again in detail here for the sake of brevity.

Figure 11:
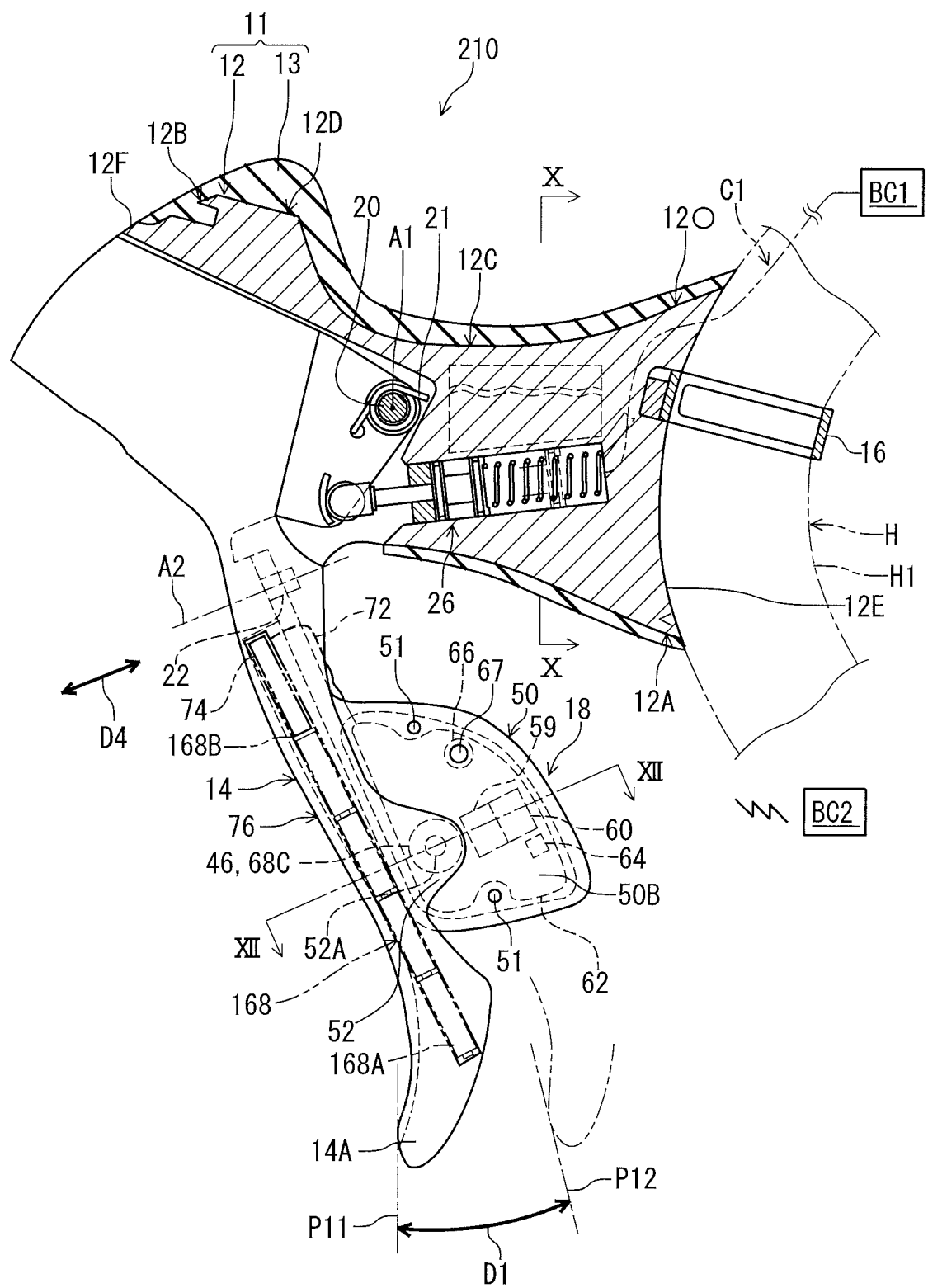
FIG. 11 is a side elevational view of an operating device in accordance with a second embodiment, with a cross-section of a base member.
Figure 12:
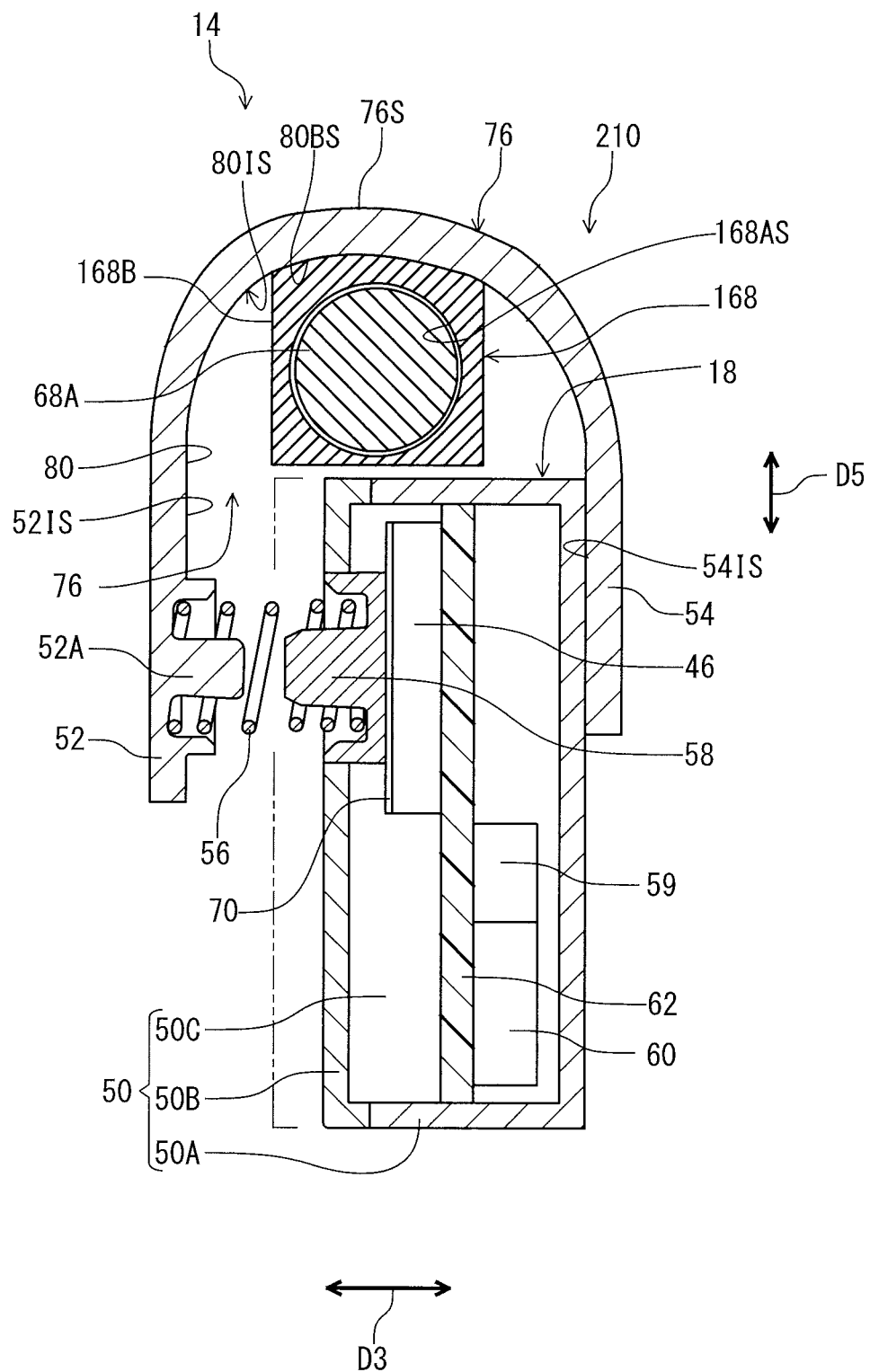
FIG. 12 is a cross-sectional view of the operating device taken along line XII-XII of FIG. 11.
Figure 13:
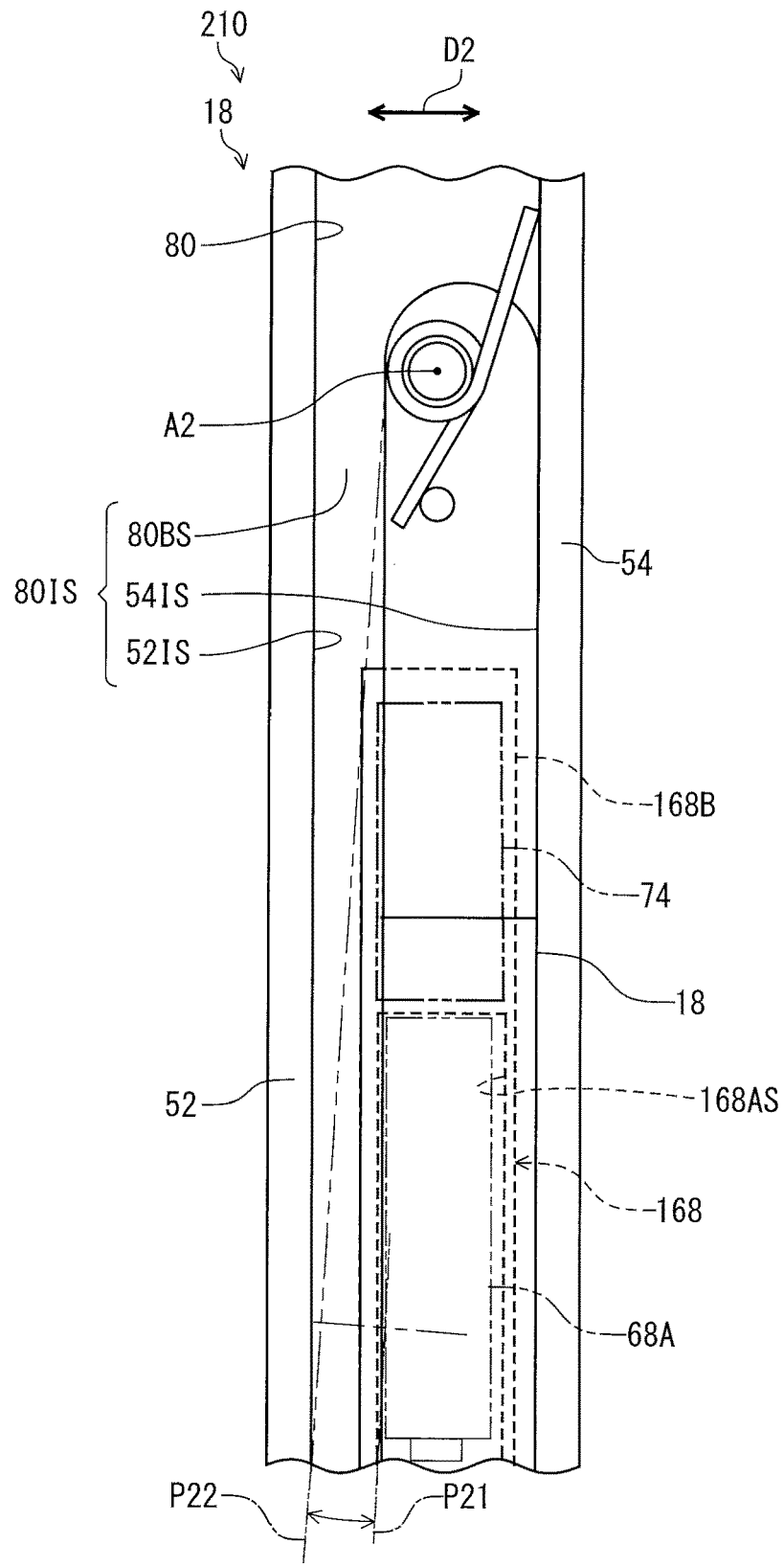
FIG. 13 is a partial rear elevational view of the operating device illustrated in FIG. 11.

As seen in FIGS. 11 to 13, in the operating device 210 of the second embodiment, the operating device 210 comprises a power storage 168 disposed on the operating member 14. The operating member 14 has an operational part 76 to which a user applied force upon operation of the operating member 14 and a non-operational part 78 opposite to the operational part 76. More specifically, the non-operational part 78 is opposite to the operational part 76 in a moving direction D5 (FIGS. 1 and 12) of the human powered vehicle 1. The power storage 168 is provided on a second location different from the first location as described in the first embodiment. In the second embodiment, the second location is defined in the operating member 14. The at least a part of the power storage 168 is provided in the non-operational part 78 of the operating member 14. More specifically, as seen in FIGS. 12 and 13, the operating member 14 has a recess 80 in the non-operational part 78. At least a part of the power storage 168 is provided in the recess 80.

As seen in FIG. 12, the operational part 76 includes an operational surface 76S to which a user applies force upon operation of the operating member 14. The recess 80 has a bottom surface 80BS opposite to the operational surface 76S in the moving direction D5 of the human powered vehicle 1. The actuation part 52 has an inner surface 52IS facing the electrical switch 46. The receiving part 54 has an inner surface 54IS which the additional operating member 18 contacts when the additional operating member 18 is positioned at the second rest position P21. The bottom surface 80BS connects the inner surface 52IS of the actuation part 52 and the inner surface 54IS of the receiving part 54IS. The bottom surface 80BS, the inner surface 52IS of the actuation part 52, and the inner surface 54IS of the receiving part 54IS constitutes an inner surface 80IS of the recess 80.

The power storage 168 includes a battery holder 168B having an attachment surface 168AS on which the battery 68A is provided. As seen in FIGS. 12 and 13, the power storage 168 has the attachment surface 168AS extending along the inner surface 80IS of the recess 80. More specifically, the attachment surface 168AS extends along the bottom surface 80BS. As seen in FIGS. 12 and 13, the at least part of the power storage 168 is not covered by the at least one of the base member 12 and the operating member 14. More specifically, the at least part of the power storage 168 is not covered by the operating member 14.

Figure 14:
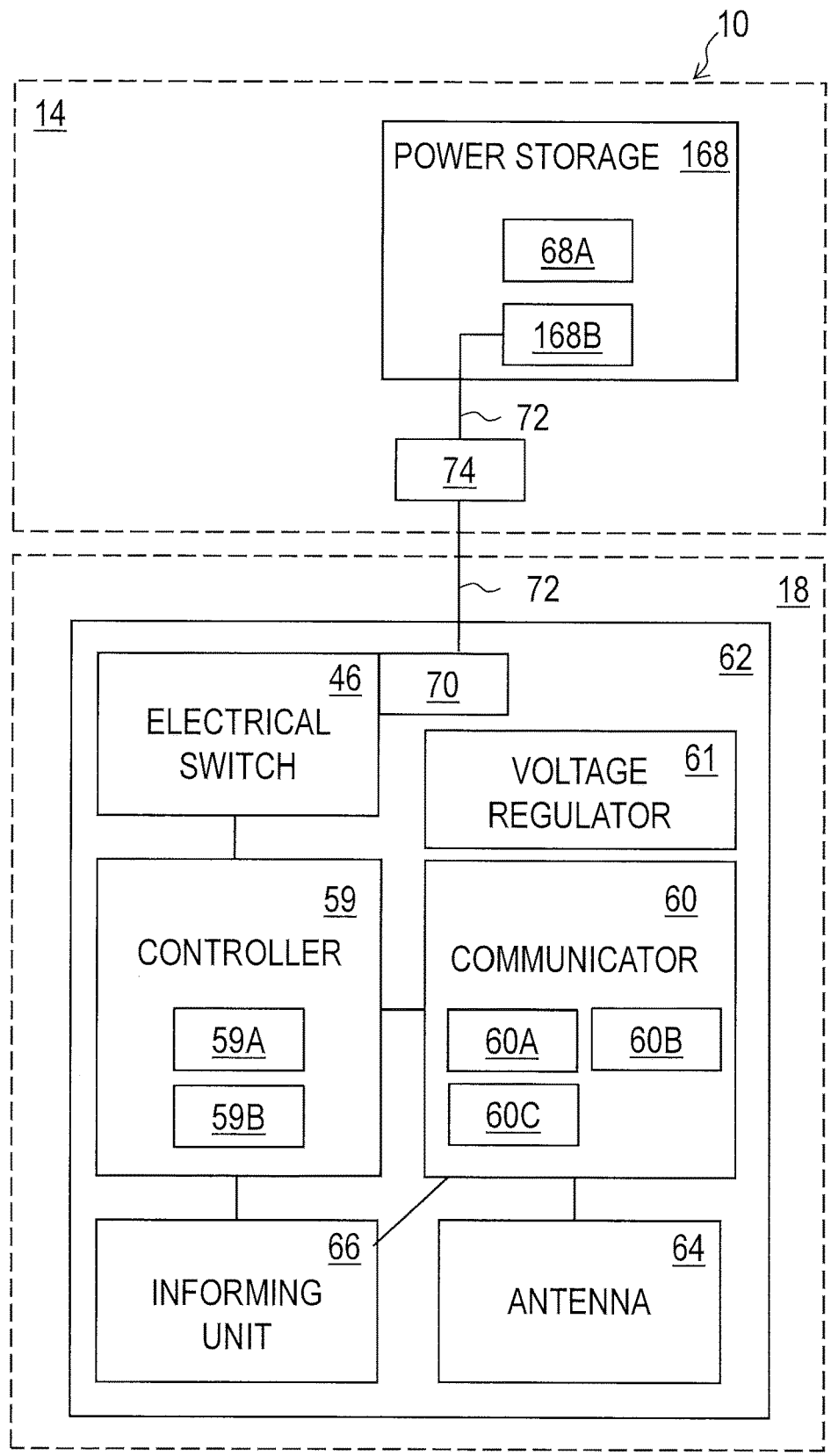
FIG. 14 is a schematic block diagram of the operating device illustrated in FIG. 11.

Since the battery holder 168B is disposed in the operating member 14, the battery 68A and the rectifier 74 are disposed in the operating member 168B, thereby the arrangement the electric wiring 72 is changed as compared to the first embodiment. As seen in FIGS. 11 and 14, the electric wiring 72 extends from the additional operating member 18 to the operating member 14. As seen in FIGS. 11 to 13, the electrical switch 46 and the electric generator 70 are provided on an additional member (the additional operating member 18) which is movable with respect to at least one of the base member 12 and the operating member 14 without separating from the operating device 210. More specifically, the additional operating member 18 is movable with respect to the operating member 14 without separating from the operating device 210 in the mounting state of the operating device 210.

In the illustrated embodiment, the operating device 210 can further comprise an additional cover detachably attached to the operating member 14 between the additional operating member 18 and the power storage 168. The additional is made of a material different from the material of the additional operating member 18. The additional cover can seal the recess 80.

The above structures of the operating device 210 of the second embodiment can be applied to the first embodiment. Accordingly, the operating device comprises both the power storage 68 and the power storage 168. Even in this case, the electrical switch 46 and the electric generator 70 are provided on an additional member (the additional operating member 18) which is movable with respect to the base member 12 and the operating member 14 without separating from the operating device in the mounting state of the operating device.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. An operating device for a human powered vehicle, comprising:
   a base member configured to be attached to a handlebar of the human powered vehicle and comprising:
      a mounting surface to be mounted on the handlebar;
      an outer surface other than the mounting surface; and
      an opening provided in the outer surface;
   an operating member configured to be pivotally coupled to the base member about a first pivot axis;
   a hydraulic unit configured to generate a hydraulic pressure in response to the operation of the operating member, the hydraulic unit comprising:
      a cylinder bore; and
      a hydraulic reservoir provided within the opening, the hydraulic reservoir being connected to the cylinder bore, the hydraulic reservoir comprising:
         a diaphragm; and
         a lid to cover the opening, the lid being configured to fix the diaphragm to the base member;
   an electrical switch;
   a controller configured to generate an operation signal in response to an operation of the electrical switch;
   an electric generator configured to generate electric power in response to the operation of the electrical switch;
   a power storage configured to store the electric power generated by the electric generator, the electrical switch and the electric generator being provided on a first location, an entirety of the power storage being provided on a second location, the second location being different from the first location, the second location being defined in the base member below the first pivot axis in a mounting state where the operating device is mounted to the handlebar of the human powered vehicle; and
   an additional operating member configured to be pivotally coupled to the operating member about a second pivot axis, the first location being defined at the additional operating member, wherein
   the base member includes an accommodating part which opens to a downward facing side of the base member, the power storage being disposed in the accommodating part, the power storage being overlapped with the hydraulic unit when viewed in a direction perpendicular to the first pivot axis,
   the power storage, the cylinder bore, the hydraulic reservoir, and the opening are aligned in a vertical direction in the mounting state when viewed in the direction perpendicular to the first pivot axis,
   the power storage, the cylinder bore, and the hydraulic reservoir are arranged in this order from bottom to top in the vertical direction, and
   an outer surface of the base member has a non-holding surface on which the power storage is provided.

2. The operating device according to claim 1, wherein the power storage is provided on the second location such that at least part of the power storage is not covered by the base member.

3. The operating device according to claim 1, further comprising:
a communicator configured to wirelessly transmit the operation signal generated by the controller.

4. The operating device according to claim 1, further comprising:
a housing accommodating at least the electrical switch and the electric generator,
wherein the power storage is provided outside the housing.

5. The operating device according to claim 1, further comprising:
a rectifier electrically arranged between the electric generator and the power storage.

6. The operating device according to claim 5, wherein the rectifier is provided in the accommodating part.

7. The operating device according to claim 1, wherein
the second location is defined on a surface of the base member,
the surface of the base member includes the outer surface, and
at least a part of the power storage is provided between the outer surface of the base member and a cover covering at least a part of the base member.

8. The operating device according to claim 7, wherein
the outer surface of the base member has a load applied surface to which a user applies a load, and
a first distance between the operating member and the non-holding surface is shorter than a second distance between the operating member and the load applied surface.

9. The operating device according to claim 7, wherein
the power storage has an attachment surface extending along the non-holding surface.

10. The operating device according to claim 1, further comprising:
a braking mechanism configured to actuate a brake device of the human powered vehicle in response to an operation of the operating member.

11. The operating device according to claim 1, wherein
the operation signal is a signal for operating a shifting device to change a gear ratio of the human powered vehicle.

12. The operating device according to claim 1, wherein the handlebar is a drop-down handlebar.

13. The operating device according to claim 1, wherein
the base member includes a grip portion and a pommel portion that extends obliquely upward from the grip portion.

14. The operating device according to claim 1, further comprising:
an additional cover detachably attached to the base member to at least partly cover the accommodating part.

15. The operating device according to claim 1, further comprising:
an electric wiring electrically connecting the power storage to the electric generator, wherein
the electric wiring extends from the electric generator along the additional operating member, and
the electric wiring is bent toward the power storage above the second pivot axis to extend toward the power storage.

16. The operating device according to claim 1, wherein
the power storage and the hydraulic unit overlap each other along a center plane of the base member when viewed in the direction perpendicular to the first pivot axis, the center plane of the base member being perpendicular to the first pivot axis.

\* \* \* \* \*